United States Patent [19]

Peck

[11] Patent Number: 5,107,158
[45] Date of Patent: Apr. 21, 1992

[54] DIAMETRAL RUNOUT REDUCER FOR ROTATING SHAFT

[75] Inventor: David E. Peck, Rochester Hills, Mich.

[73] Assignee: Rockwell International Corporation, Pittsburgh, Pa.

[21] Appl. No.: 590,994

[22] Filed: Oct. 1, 1990

[51] Int. Cl.[5] ................... H02K 5/16; F16C 25/04
[52] U.S. Cl. ........................... 310/90; 384/192
[58] Field of Search ................. 310/90, 80, 83; 384/192, 204

[56] References Cited

U.S. PATENT DOCUMENTS

| | | | |
|---|---|---|---|
| 3,150,900 | 9/1964 | Bruenig | 384/192 |
| 4,416,492 | 11/1983 | Singletary | 384/192 |
| 4,747,810 | 5/1988 | Shepley et al. | 384/192 |
| 4,954,735 | 9/1990 | Parsons | 310/83 |

Primary Examiner—Steven L. Stephan
Assistant Examiner—D. L. Rebsch

[57] ABSTRACT

An apparatus which may be used to drivingly engage a rotating shaft, reduce the effect of the diametral runout thereof and drive a rotary sensor, including a sleeve placed coaxially about the shaft, drivingly engaging the shaft by means of mating splines. Any diametral runout (eccentric or displaced rotation) present in the shaft is directly imparted to the driven end of the sleeve. A spherical annular protrusion extends radially outwardly from the sleeve and slidingly engages a bore having a central axis coincident with the preferred axis of rotation. In this manner, the center of the spherical annular protrusion, and consequently that portion of the sleeve, is maintained coincident with the preferred axis of rotation. The opposing end of the sleeve drivingly engages a rotary sensor with mating splines. If diametral runout is present in the rotating shaft, the sleeve will gimble about the center point of the spherical annular protrusion 30. A reduction in runout will be realized which is in proportion to the ratio of the distance from the center point of the spherical protrusion to the driven end versus the distance from the center point to the driving end.

4 Claims, 3 Drawing Sheets

DIAMETRAL RUNOUT REDUCER FOR ROTATING SHAFT

BACKGROUND OF THE INVENTION

1. Description of the Related Art

This invention relates to sensors used for measuring the rotational speed of a shaft with respect to a fixed housing and, more particularly, a device which may be used to drivingly engage a rotating shaft, reduce the diametral runout thereof and drive a rotary sensor.

2. Description of the Prior Art

Rotary sensors are utilized to detect the rotating speed of shafts used to propel and/or position bodies. To maintain control over such bodies, it is important to continuously monitor shaft rotational speed. Techniques to monitor rotary speed have become increasingly accurate. Along with such accuracy comes the necessity to drive the sensor via a rotating shaft having a minimal diametral runout. Costly expenditures are necessary to reduce diametral runout by reducing dimensional tolerances of the components which collectively generate the runout. Therefore, there is a need to inexpensively reduce the effect of runout of a shaft which is used to drive a rotary speed sensor.

SUMMARY OF THE INVENTION

The present invention is an apparatus which may be used to drivingly engage a rotating shaft, reduce the effect of the diametral runout (eccentricity) thereof and drive a rotary sensor, including a sleeve placed coaxially about the rotating shaft and drivingly engaging the shaft by means of mating splines. Any diametral runout present in the rotating shaft is directly imparted to the driven end of the sleeve. A spherical annular protrusion extends radially outwardly from the sleeve and slidingly engages a bore having a central axis coincident with the preferred axis of rotation. In this manner, the center of the spherical annular protrusion, and consequently that portion of the sleeve, is maintained coincident with the preferred axis of rotation. The opposing end of the sleeve drivingly engages the rotary sensor with mating splines. If diametral runout is present in the rotating shaft, the sleeve will gimble about the center point of the spherical annular protrusion. A reduction in runout will be realized which is in proportion to the ratio of the distance from the center point of the spherical protrusion to the driven end versus the distance from the center point to the driving end.

In the preferred embodiment of the present invention there is associated with a housing having a rotatable shaft extending through a first opening therein, an apparatus for drivingly engaging the shaft, reducing the diametral runout about a central axis driving a rotary sensor comprising, a first annular axially extending member having a first end drivingly engaging a coaxially disposed shaft, a second opposing end of the first annular member drivingly engaging the sensor, the first annular member having a radially extending portion disposed proximate the second end defining a peripheral surface which extends equidistantly from a central point, a second annular extending member having a bore having a central axis which is maintained coincident with a preferred axis of rotation and the bore having a dimensional interrelationship with the radially extending portion which facilitates sliding relation therebetween, thereby maintaining the central point coincident with the central axis wherein diametral runout of the second end with respect to the first end is reduced by the distance between the central point and the first end divided by the distance between the central point and the second end. In another embodiment of the present invention there is associated with the housing having a rotatable shaft extending through a first opening therein, an apparatus for drivingly engaging the shaft, reducing the diametral runout about a central axis and driving a rotary sensor comprising a cylindrical member having a first bore disposed about the shaft, a first end of the cylindrical member drivingly engaging the shaft, a second end of the cylindrical member drivingly engaging the sensor, an annular protrusion defining a spherically shaped annular profile extending from the cylindrical member proximate the second end and the housing defining a second bore having an axis coincident with the central axis and oriented coaxial to and in sliding relation to the annular protrusion whereby the second bore maintains the annular protrusion in a rotational axis coincident with the central axis and wherein diametral runout of the second end with respect to the first end is reduced by the distance between the center of the annular protrusion and the first end divided by the distance between the center of the annular protrusion and the second end.

These and other aspects of the present invention will become more readily apparent by reference to the following detailed description of the embodiments as shown in the drawings.

DETAILED DESCRIPTION OF THE DRAWINGS

DESCRIPTION OF THE PREFERRED EMBODIMENT

Figure 1:
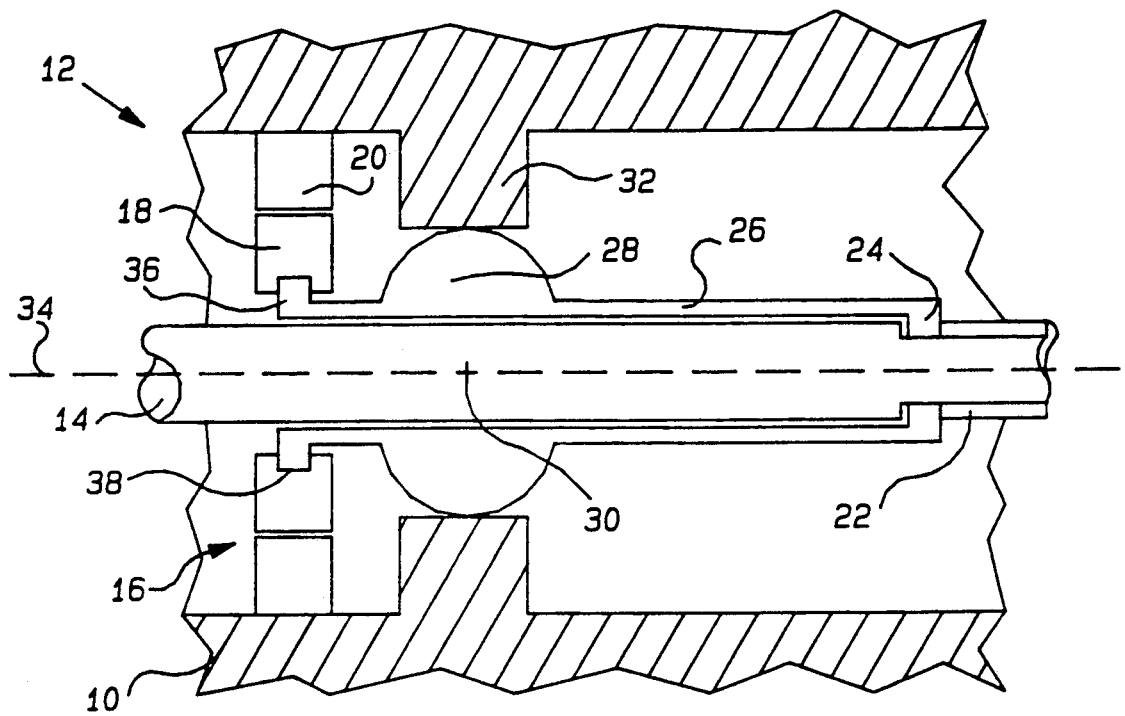
FIG. 1 is a cross-section of the preferred embodiment of the present invention.
Figure 3:
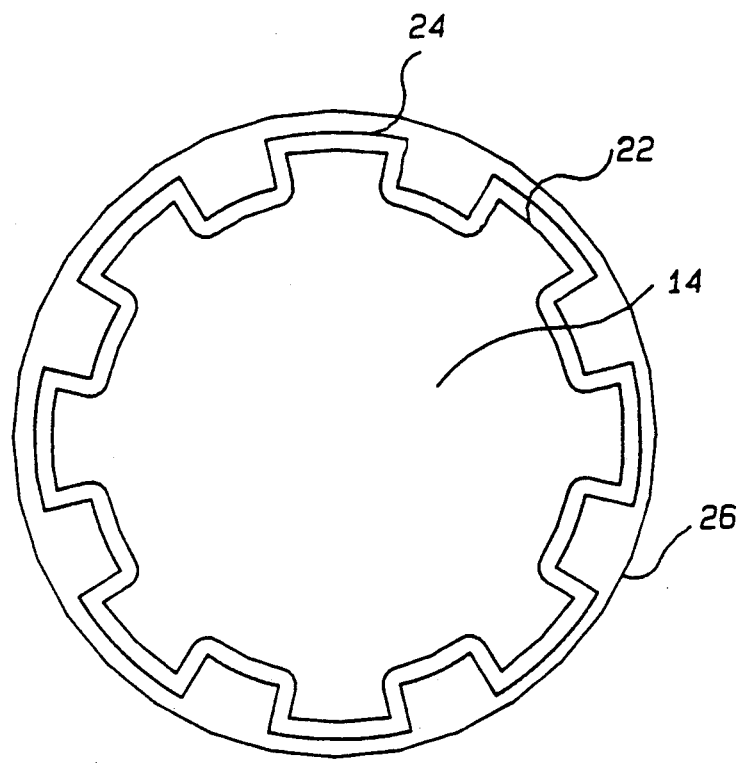
FIG. 3 is a cross-sectional view of the splined engagement between the sleeve of the present invention and a rotatable shaft.
Figure 4:
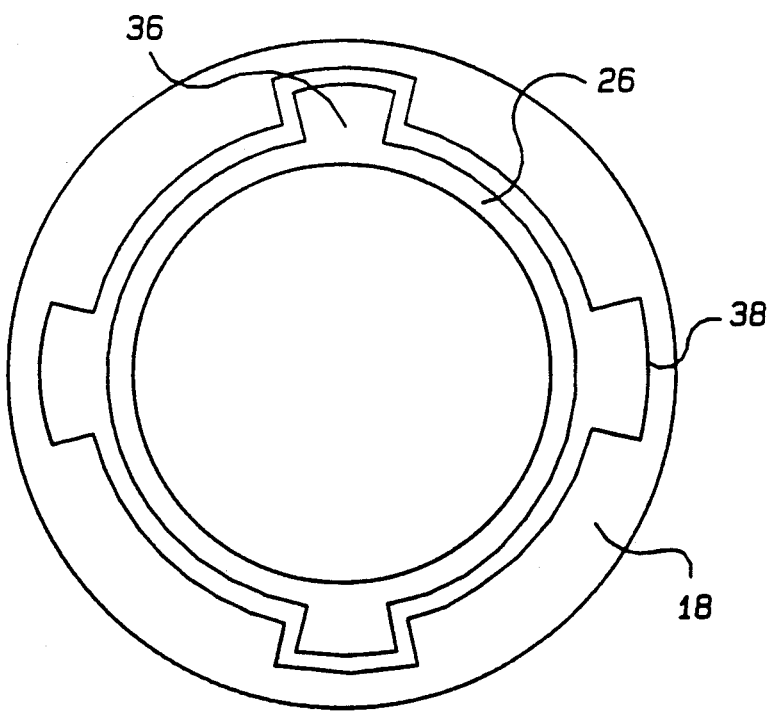
FIG. 4 is a cross-sectional view of the splined engagement between the sleeve of the present invention and a rotary sensor.

The preferred embodiment of the present invention as shown in FIG. 1 includes a housing 10 having opening 12 defined therein through which shaft 14 passes. Shaft 14 is supported by bearings (not shown) for rotation to provide motive force to propel a vehicle (for example). Speed sensor 16 has a rotating portion 18 and a stationary portion 20 secured to housing 10. An example of a sensor which may be driven by the apparatus of the present invention is described in now pending U.S. patent application Ser. No. 07/463,736 herein incorporated by reference. External splines 22 formed on shaft 14 mate with respective internal splines 24 formed on sleeve 26 to accomplish driving engagement therebetween. (See FIG. 3) The mating splines 22, 24 engage one another in a manner in which any diametral runout present in shaft 14 will be imparted directly to sleeve 26. Sleeve 26, as shown in FIG. 1, includes a radially extending spherical protrusion 28 which presents a spherical annular profile having center 30. Housing 10 includes a reduced diameter portion 32 which slidingly engages protrusion 28 to maintain center 30 coincident with a preferred axis of rotation, axis 34. In this manner, the diametral runout of sleeve 26 in the portion of protrusion 28 is totally eliminated. Sleeve 26 further includes external spline 36 which mates with internal spline 38 to rotatively drive portion 18 of sensor 16. (See FIG. 4). Sleeve 26 may be made from machined metal, die cast metal, or an injection molded plastic such as nylon.

Figure 2:
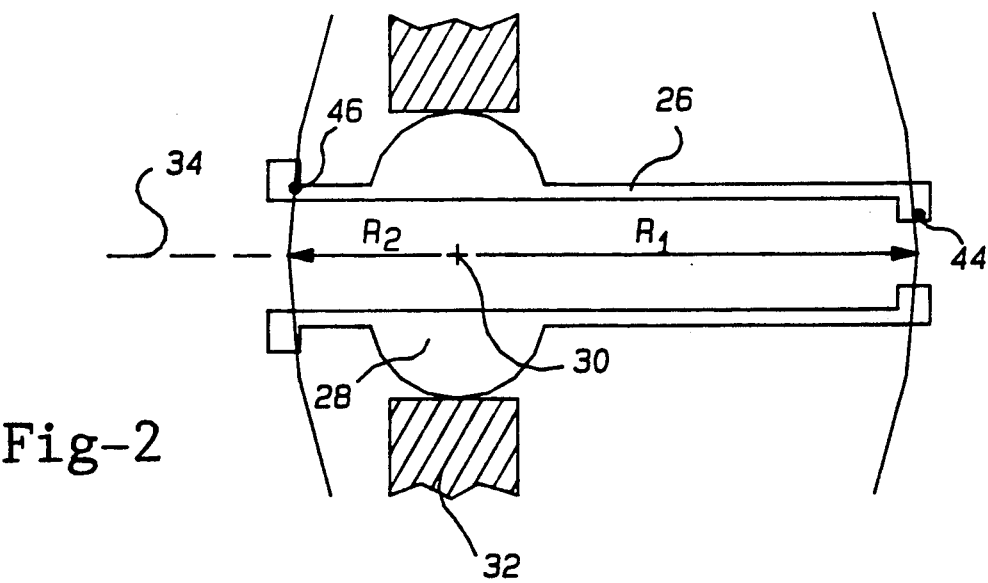
FIG. 2 is a diagrammatic representation of the reduction in diametral runout achieved in the present invention.

FIG. 2 illustrates the phenomena by which diametral runout reduction is accomplished by the present invention. That is, diametral runout of sleeve 26 at the end driven by shaft 14 follows an arc being traced by a point 44 along a radius of length R1. Center point 30 of spherical annular protrusion 28 is maintained coincident with the preferred axis of rotation 34 by sliding engagement with annular section 32. In this manner, all diametral radial runout is eliminated from sleeve 26 in the region of spherical annular protrusion 28. The other end of sleeve 26 engages and drives a rotary sensor 16 (not shown). Diametral runout present in the portion of sleeve 26 driving the sensor is illustrated as following an arc being traced by point 46 along a radius of length R2. The arc length traveled by point 46 is reduced from the length traveled by point 44 by the proportion R1/R2. Selection of the dimensions R1 and R2 may be made to accommodate varying amounts of diametral runout as may be demanded by the specific application.

Figure 5:
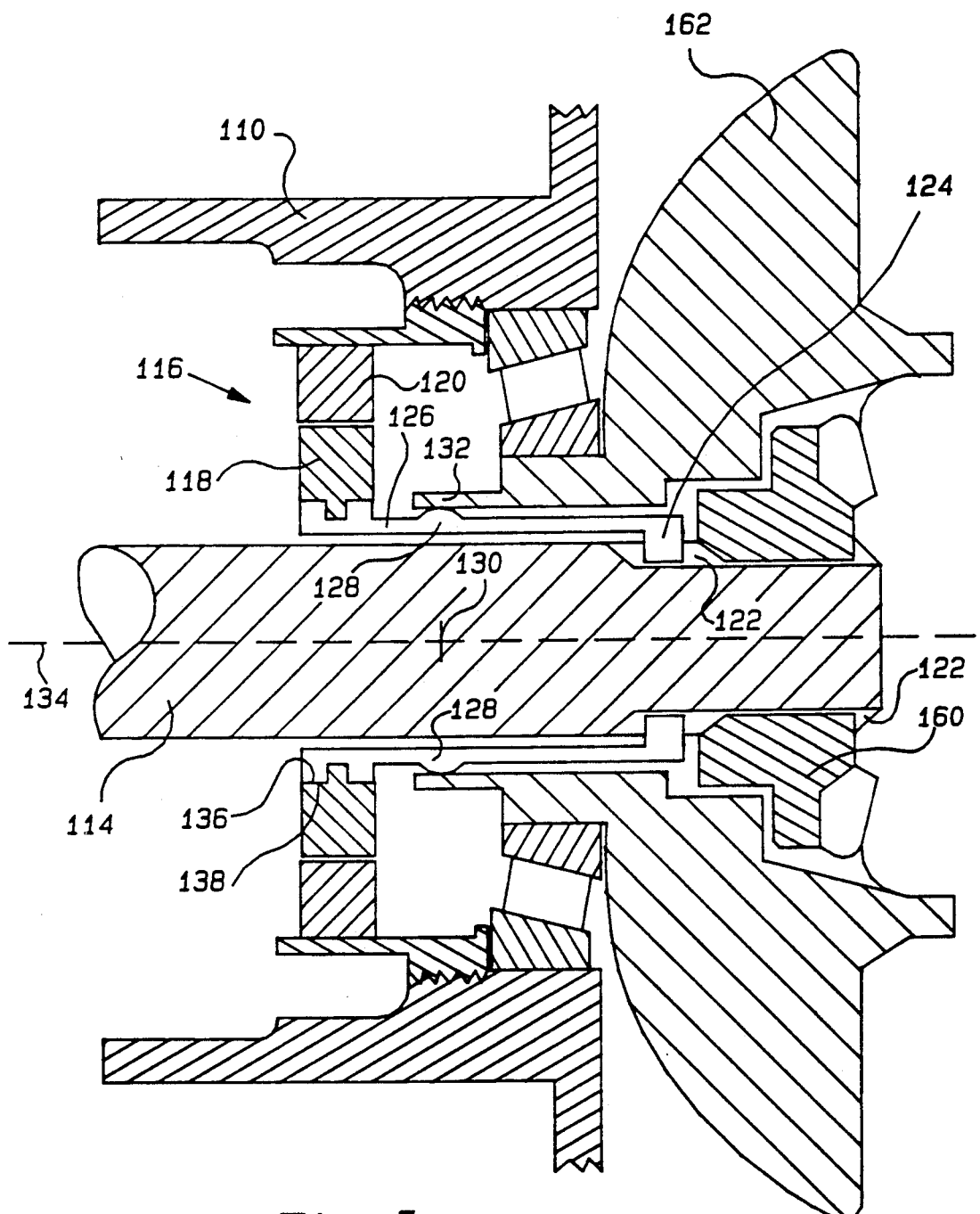
FIG. 5 is the present invention incorporated in a vehicle drive-axle housing.

In another embodiment, as shown in FIG. 5, the diametral runout reducer of the present invention is incorporated in axle housing 110 for driving rotary sensor 116 comprising rotating portion 118 and fixed portion 120. Axle shaft 114 includes external splines 122 which engage respective internal splines in side gear 160. Side gear 160 is supported for rotation in differential case 162 as shown. Sleeve 126 includes internal splines 124 which matingly engage splines 122 in axle shaft 114. In this manner, sleeve 126 is rotatably driven such that any diametral runout in shaft 114 is directly imparted to sleeve 126. Sleeve 126 includes a radially extending spherical annular protrusion 128 having center 130. Differential case 162 includes an extension 132 which slidingly engages protrusion 128 to maintain center 130 coincident with axis 134. In this manner, the diametral runout of sleeve 126 in the region of annular protrusion 128 is totally eliminated. Sleeve 126 further includes external splines 136 which mate with internal splines 138 to rotatively drive portion 118 of sensor 116. The reduction in diametral runout accomplished by the present invention is a result of the phenomena described in relation to the preferred embodiment of the present invention as illustrated in FIG. 2. One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

We claim:

1. Associated with a housing having a rotatable shaft extending through a first opening therein, an apparatus for drivingly engaging said shaft, reducing the diametral runout about a central axis and driving a rotary sensor comprising:

a first annular axially extending member having a first end drivingly engaging a coaxially disposed shaft;

a second opposing end of said first annular member drivingly engaging said sensor;

said first annular member having a radially extending portion disposed proximate said second end defining a peripheral surface which extends equidistantly from a central point;

a second annular axially extending member defining a bore having a central axis which is maintained coincident with a preferred axis of rotation; and said bore having a dimensional interrelation with said radially extending portion which facilitates sliding relation therebetween, thereby maintaining said central point coincident with said central axis wherein diametral runout of said second end with respect to said first end is reduced by the distance between the central point and the first end divided by the distance between the central point and the second end.

2. The invention of claim 1 wherein said second annular extending member defining a bore is maintained fixed with respect to said housing.

3. The invention of claim 1 wherein said second annular extending member defining a bore is journalled in said housing facilitating rotation about said central axis.

4. Associated with a housing having a rotatable shaft extending through a first opening therein, an apparatus for drivingly engaging said shaft, reducing the diametral runout about a central axis and driving a rotary sensor comprising:

a cylindrical member defining a first bore disposed about said shaft;

a first end of said cylindrical member drivingly engaging said shaft;

a second end of said cylindrical member drivingly engaging said sensor;

an annular protrusion defining a spherically shaped annular profile extending from said cylindrical member proximate said second end; and said housing defining a second bore having an axis coincident with said central axis and oriented coaxial to and in sliding relation to said annular protrusion whereby said second bore maintains said annular protrusion in a rotational axis coincident with said central axis and wherein diametral runout of said second end with respect to said first end is reduced by the distance between the center of the annular protrusion and the first end divided by the distance between the center of the annular protrusion and the second end.

* * * * *